Patented Oct. 6, 1925.

1,555,818

UNITED STATES PATENT OFFICE.

WILLIAM S. BARNICKEL, OF ST. LOUIS, MISSOURI; SEARS LEHMANN AND JOHN S. LEHMANN EXECUTORS OF THE SAID WILLIAM S. BARNICKEL, DECEASED.

PROCESS FOR TREATING PETROLEUM EMULSIONS.

No Drawing. Application filed April 23, 1923. Serial No. 634,184.

*To all whom it may concern:*

Be it known that I, WILLIAM S. BARNICKEL, a citizen of the United States, residing at St. Louis, Missouri, have invented a certain new and useful Improvement in Processes for Treating Petroleum Emulsions, of which the following is a full, clear, and exact description, such as will enable others skilled in the art to which it appertains to make and use the same.

This invention relates to the treatment of petroleum emulsions for the purpose of separating the oil and rendering same fit for commercial use, the present application being a continuation in part of my application that resulted in U. S. Patent No. 1,467,-831, for process for treating petroleum emulsions, dated September 11, 1923.

In my said patent I have described a process for treating petroleum emulsions that contemplates using a modified fatty acid to break the emulsion and cause the oil in the emulsion to separate from the water or brine. The object of my present invention is to provide still another process by which petroleum emulsions of a relatively permanent nature that contain varying amounts of oil, water or brine and colloidal matter can be separated into their component parts of oil and water or brine.

Briefly stated, my present process consists in subjecting a petroleum emulsion to the action of a derivative of a resin, as herein defined to alter by chemical action the colloidal matter in the emulsion so as to destroy the stability of the emulsion and cause it to break, yielding an upper stratum of oil and a lower stratum of water or brine when the emulsion is permitted to stand in a quiescent state. Various chemical agents such as derivatives of a rosin acid, a resin, or an oleo-resin will break a petroleum emulsion more or less effectively. Hence, for the sake of brevity, I have herein used the term "derivative of a resin" in the claims to mean and include derivatives of rosin acids, resins and oleoresins, and in fact, any substance derived from resin and in which the substitution or addition occurs in the hydrocarbon radical and not in the carboxyl radical, thus excluding rosin soaps of the kind mentioned in my U. S. Patent No. 1,223,659, dated April 24, 1917. The particular chemical agent that is used to treat a certain petroleum emulsion will depend upon the nature of the emulsion, as such emulsions differ greatly in their composition as to the character of the oil and water contained therein, the kinds and amount of salts dissolved therein and the nature and amount of the colloidal matter present in the emulsion. While my broad idea contemplates the use of derivatives of resin, as previously defined, I have found that petroleum emulsions of the kind referred to can be effectively treated with substances obtained by the action of chlorine, bromine, nitric acid, sulfuric acid, sulfur chloride, etc., upon resin and upon mixtures of resin and aromatic substances, the resulting product being washed with water and neutralized with alkalis.

In practicing my process I introduce a relatively small quantity of one of the above named agents (from .01% to 1%) into a relatively large quantity of the emulsion and allow the mass to stand until the emulsion breaks and separates into an upper stratum of oil and a lower stratum of water or brine. In most instances I intimately mix the chemical agent with the emulsion being treated and in some cases I also apply heat to the mixture until the emulsion breaks and separates. In many instances, however, it is sufficient to merely bring the chemical agent in contact with the emulsion.

One convenient way of practicing my process is to fill a tank with the emulsion to be treated and then introduce a chemical agent of the kind referred to into the emulsion while the emulsion is subjected to heat and to agitation. The temperature at which the emulsion is maintained during the treating operation will vary according to the character of the emulsion and the degree of agitation and period that the agitation is continued will also vary. Usually the emulsion is agitated for about thirty minutes after the chemical agent has been introduced into same, whereupon the emulsion breaks, which action is indicated by the formation of large drops of water throughout the mass and in the change of the color of the mixture of the natural color of the oil. The mass is then allowed to stand in a quiescent state so as to permit the oil to rise to the top and the water and brine to settle to the bottom of the mass. The water is then drawn off, leaving the oil ready for marketing, or, if desired, the oil can be drawn off.

The quantity of the chemical agent that is used generally depends upon the percentage of colloidal matter present in the emulsion. I generally use from 50 to 300 lbs. (from .01% to 1%) of one of the chemical agents previously mentioned, or a combination of said chemical agents, to 1000 bbls. of the petroleum emulsion to be treated, sometimes heating the mixture to from 100° F. to 150° F. and agitating the mixture thoroughly by means of air or gas under pressure. After the emulsion breaks the water settles out in a few hours, the time varying with the character of the emulsion being treated.

While I have previously stated that the emulsion is subjected to heat during the operation of treating it with the chemical agent, this is not necessary in all instances, particularly when treating emulsions freshly produced from the ground, as I have found that mere agitation of the chemical agent with freshly produced emulsion causes the emulsion to break and separate into its component parts, as previously described. I have also found that with some emulsions mere contact of the chemical agent with the emulsion will cause the emulsion to break and separate into its component parts of oil and water or brine when the emulsion is permitted to stand in a quiescent state, after being subjected to the action of said chemical agent.

Having thus described my invention, what I claim as new and desire to secure by Letters Patent is:

1. In a process for treating petroleum emulsions the step of subjecting the emulsion to the action of a derivative of a resin in which substitution or addition occurs in the hydrocarbon radical, to break the emulsion.

2. In a process for treating petroleum emulsions the step of introducing a relatively small quantity of a derivative of a resin in which substitution or addition occurs in the hydrocarbon radical, into a relatively large quantity of the emulsion so as to break the emulsion.

3. A process for treating petroleum emulsions which consists in introducing a derivative of a resin in which substitution or addition occurs in the hydrocarbon radical, into the emulsion to break the emulsion, and thereafter permitting the emulsion to stand in a quiescent state, whereupon the oil contained in the emulsion will rise to the top of the mass.

4. A process for treating petroleum emulsions consisting in introducing a derivative of a resin in which substitution or addition occurs in the hydrocarbon radical, into the emulsion, heating the emulsion, and thereafter allowing the emulsion to stand until the oil therein separates and rises to the top of the mass.

5. A process for treating petroleum emulsions which consists in introducing into such an emulsion and distributing thoroughly through the same, a relatively small quantity of a derivative of a resin in which the substitution or addition occurs in the hydrocarbon radical, so as to cause the emulsion to break, allowing the emulsion to stand, whereupon the oil contained therein will rise to the top of the mass, and thereafter drawing off the oil.

6. A process for treating petroleum emulsions which consists in introducing into the emulsion being treated a relatively small quantity (from .01% to 1%) of a derivative of a resin in which substitution or addition occurs in the hydrocarbon radical, so as to break the emulsion, and permitting the emulsion to stand so as to cause the oil to rise to the top of the mass.

WILLIAM S. BARNICKEL.